UNITED STATES PATENT OFFICE.

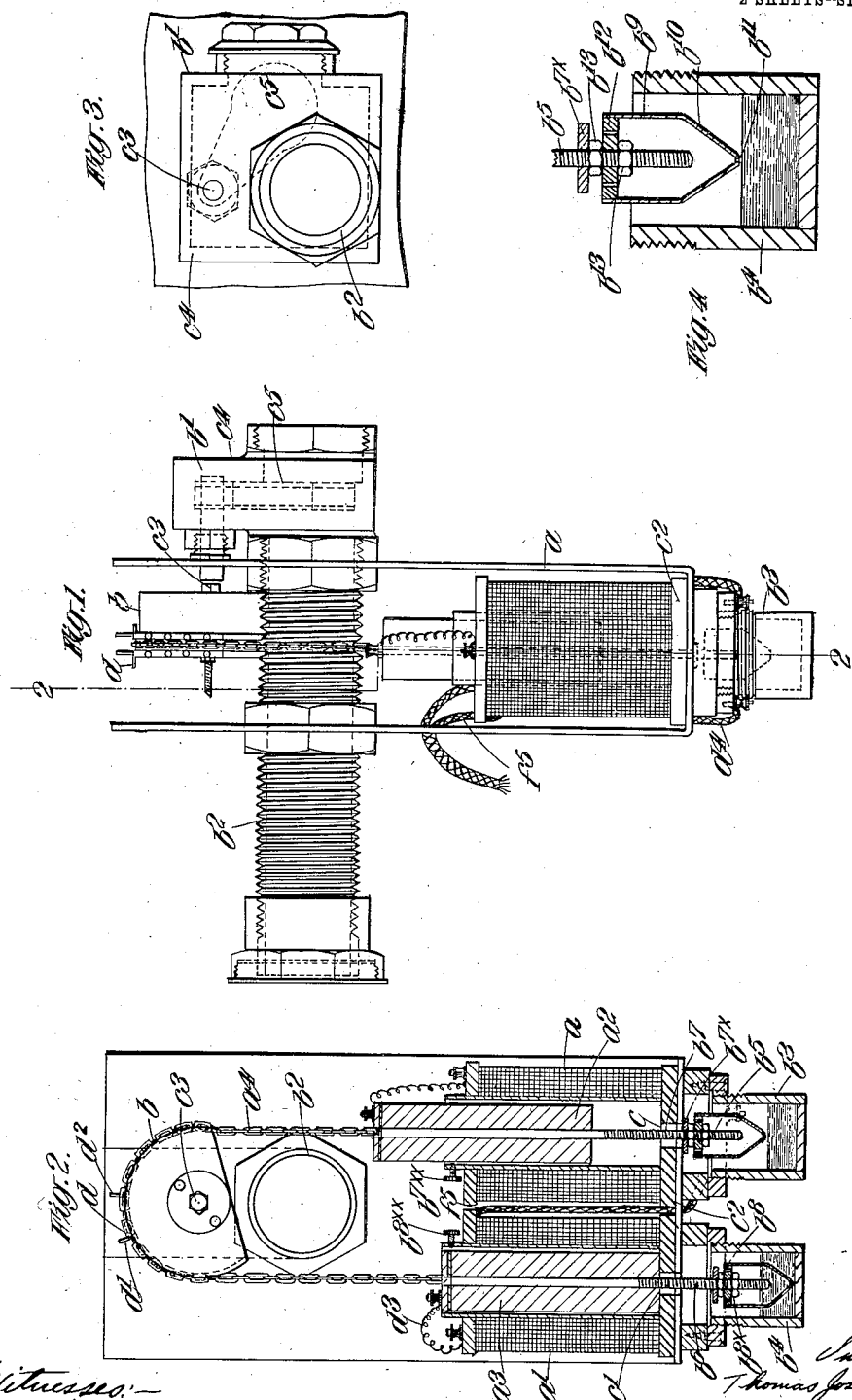

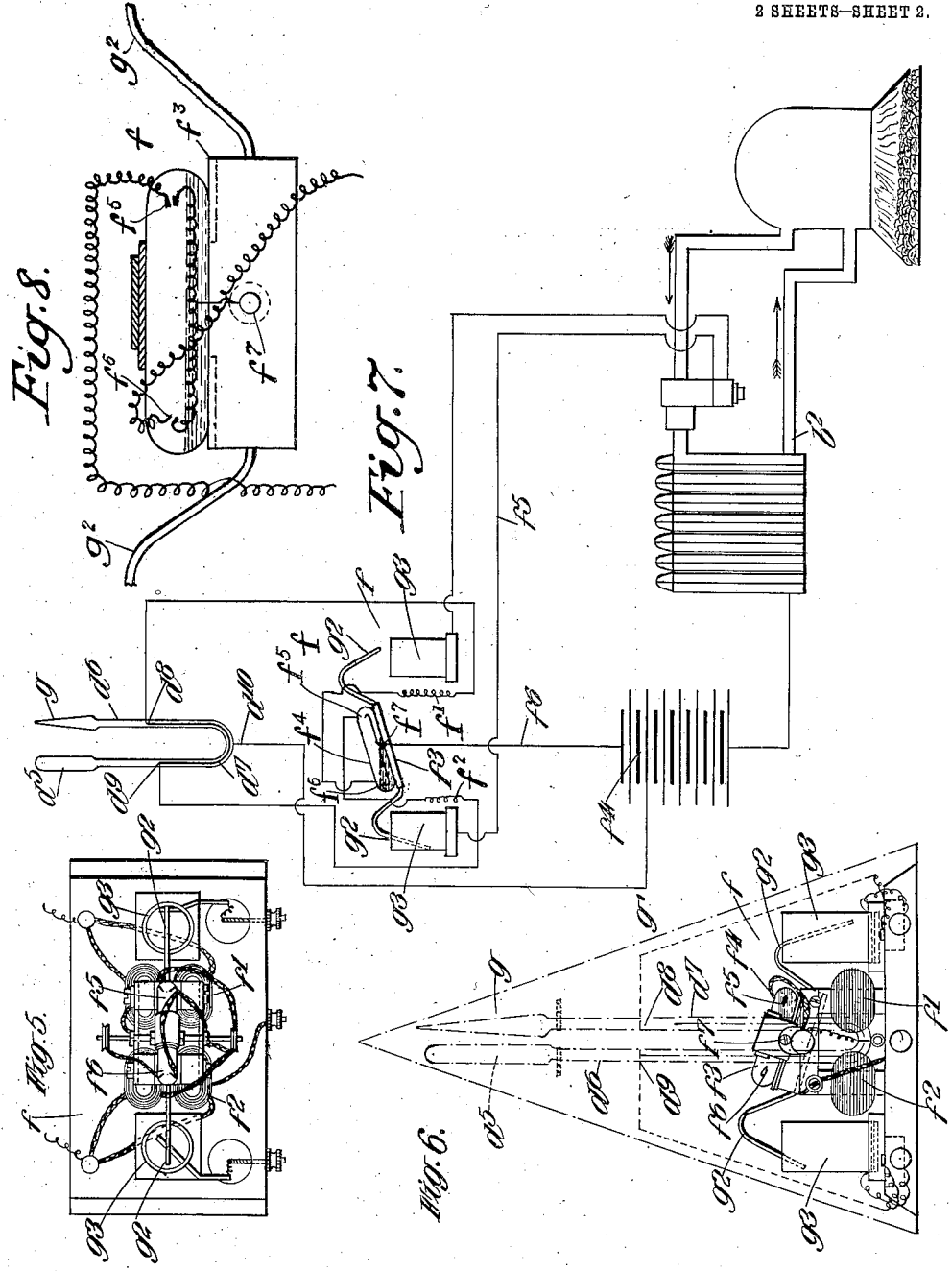

THOMAS JOSEPH RORKE AND EDWIN RORKE, OF BARNES, ENGLAND, ASSIGNORS OF ONE-THIRD TO HARRY STANLEY BENSON, OF BARNES, ENGLAND.

ELECTROMAGNETIC REGULATING OR CONTROLLING MEANS FOR VALVES OR THE LIKE.

1,056,124. Specification of Letters Patent. Patented Mar. 18, 1913.

Application filed December 6, 1910. Serial No. 595,936.

*To all whom it may concern:*

Be it known that we, THOMAS JOSEPH RORKE and EDWIN RORKE, both subjects of the King of Great Britain, residing at Thames Bank Electrical Works, Barnes, in the county of Surrey, England, have invented certain new and useful Improvements in Electromagnetic Regulating or Controlling Means for Valves or the Like, of which the following is a specification.

This invention consists of certain improvements in or relating to systems for controlling or regulating the flow of gases or fluids by electro-magnetically operated valves or other obturating devices, an object being to obtain a more perfect regulation of the heating effect or control of the flow of gas or fluid in any system by employing a sensitive form of thermostat with the aforesaid electro-magnetically operated valves or obturating devices.

Heretofore the valves or similar devices have required considerable power to effect their operation and it has been customary to employ thermostats which are adapted to carry or take heavy currents and which are insensitive to small variations in temperature, as, for example, the well known form of thermostat which comprises a compound bar or strip composed of metals having different co-efficients of expansion. In order to permit of the employment of a highly sensitive form of thermostat with the electro-magnetically operated valve or obturating device it is necessary however to arrange that only light currents shall pass through the thermostat, and that the circuit for the said current shall be broken outside or independently of the thermostat in order to protect the same from the harmful effects of the sparking which takes place when the circuit is ruptured.

According to this invention, the employment of a thermostat of the aforesaid character is rendered possible by providing an apparatus which comprises a number of electro-magnets or solenoids adapted to act on suitable armatures or cores and thereby transmit movement so as to operate cutting off or controlling means such as valves or other obturating devices, the arrangement being such that the circuit for the current which energizes the electro-magnet or solenoid actuating the controlling means is established at the thermostat and is automatically broken at the apparatus when the desired movement has been imparted to the valve or the like. The same result may be attained by providing an intermediate switch which would serve as a relay and permit of the thermostat being worked with a weak current.

In order that the said invention may be clearly understood and readily carried into effect, we will proceed to describe the same with reference to the accompanying drawings which illustrate as an example of the use of the invention the application thereof to a system of heating by hot water. It will, however, be readily understood that the system is equally applicable for use in the regulation or control of the flow of steam or other gaseous fluid.

Figure 1 is a side elevation of the controlling or regulating apparatus pertaining to the system. Fig. 2 is a vertical section taken along the line 2—2 in Fig. 1. Fig. 3 is an end view of a part of the apparatus. Fig. 4 is a detail view of the mercury cups and the extensions for making and breaking electrical contact. Fig. 5 is a plan view of the intermediate switch. Fig. 6 is a diagrammatic view showing the invention applied to a system of heating by hot water or steam. Fig. 7 is an elevation of the thermostat and intermediate switch. Fig. 8 is a detail view of the circuit controlling mechanism of the intermediate switch.

Referring to Figs. 1 to 4 of the drawings, the apparatus comprises two solenoids $a$, $a'$ which are adapted to act on two cores $a^2$, $a^3$ connected together by any suitable means such as a chain $a^4$ or the like. The flexible connection or chain $a^4$ may be arranged to pass over a sector $b$ or pulley operatively connected with a valve or obturating device $b'$ placed in the hot water pipe range $b^2$. The lower extremities of the electro-magnets or solenoids are provided with mercury cups $b^3$, $b^4$ into which extensions $b^5$, $b^6$ on the cores are adapted to enter and make electrical contact. These extensions $b^5$, $b^6$ may comprise nickel pins secured to the cores $a^2$, $a^3$ and having suitable nuts or stops $b^7$, $b^8$ arranged thereon so as to regulate the degree of movement of the cores. To effect this object the pins $b^5$, $b^6$ may pass through apertures $c$, $c'$, formed in the base $c^2$ of the electro-magnets or solenoids $a$, $a'$, the movement of the pins being restricted owing to the stops thereon engaging with the base. By this means the cores $a^2$, $a^3$ are prevented from leaving the electro-magnets or solenoids when the apparatus is displaced or inverted. In order further to provide against the mercury leaking away past the nuts $b^7$ $b^8$ washers $b^{7\times}$ $b^{8\times}$ of india rubber, leather or other insulating and yielding material may be applied so that when the cores are withdrawn and secured temporarily by set-screws indicated at $b^{7\times\times}$ $b^{8\times\times}$, the said washers make a tight joint with the base $c^2$ and effectually prevent the mercury finding an exit through the apertures $c$ $c'$ and the hollows of the cores $a^2$ $a^3$ and magnets $a$ $a'$. The two cores are of equal weight and the chain $a^4$ or the like connecting the same is secured to the aforesaid sector $b$ so as to actuate the same when the one or the other of the electro-magnets or solenoids $a$, $a'$ is energized. For the purpose of enabling the contact to remain unbroken until the core of the actuating solenoid has completed its movement and to avoid jar or shock, the extensions are each furnished with a hollow container $b^9$ $b^9$, composed of steel, nickel, or other suitable metal or material and having a conical or taper extremity $b^{10}$ formed with a small aperture $b^{11}$. The container is attached to the extension by means of an insulating bush $b^{12}$ which is secured to the extension by means of nuts or washers $b^{13}$; the aforesaid india rubber washers $b^{7\times}$ $b^{8\times}$ being applied above the said fitting. By these means the contact is tailed off or extended, as, during immersion, the mercury enters and rises in the container $b^9$ and when the cores are raised the mercury leaves the container slowly by way of the aperture $b^{11}$ thereby prolonging or timing the contact. The sector or pulley may be mounted on a spindle $c^3$ which passes through the casing $c^4$ of a valve $c^5$ arranged in the pipe range, said spindle carrying at its other extremity the valve body or slide. This latter may resemble an ordinary sluice valve and may have parallel faces or be wedge-shaped. When the sector $b$ is actuated by the electro-magnets or solenoids $a$, $a'$ the valve $c^5$ is moved toward or away from its seating according to which of said electromagnets is energized. In order to permit of the adjustment of the degree of opening or closing of the valve, the connection or chain $a^4$ is arranged on the sector $b$ in such a manner as to allow of relative movement between these parts, said movement depending upon the position the valve $c^5$ is to assume. This adjustable connection between the sector $b$ and core chain $a^4$ is effected by means of a projection $d$ on the chain which is arranged between two series of pins or stops $d'$, $d^2$ mounted on the sector. For normal working—complete shutting and opening of the valve—the projection $d$ on the chain is arranged between the pins or stops $d'$, $d^2$ so as to be securely held thereby, but when the degree of opening or closing of the valve is to be varied the space between the two series of pins or stops may be increased. By this arrangement the chain $a^4$ will effect a predetermined movement before it engages with the pins or stops $d'$, $d^2$ and actuates the sector $b$ over which it passes. The periphery of the sector is provided with a series of holes which correspond to the various degrees of opening or closing of the valve $c^5$ and the pins on the sector may be readily placed in the said holes and the valve set as desired.

In order that the setting may be readily effected and observed the casing of the apparatus may be provided with an indicator, not shown, which is set to correspond with the position of the pins on the sector or pulley, the attendant will thus be able to see at a glance how the valve is set for working.

Any other method of connecting the chain to the sector or pulley may be employed so long as it is possible to obtain the desired adjustability.

The current for actuating the apparatus is provided with two paths through the respective electro-magnets or solenoids $a$, $a'$; the current from the battery or other source may flow for example through the piping $b^2$ of the installation, lead $d^3$ through the core or armature $a^3$ of the electro-magnet $a'$ which was last energized through the extension or pin $b^6$ secured to said core into the mercury in the container $b^9$ and the cup $b^4$ into which said pin enters and from thence by way of the lead $d^4$ to the winding of the other electro-magnet $a$ and back to the battery. This latter electro-magnet will be energized and its core or armature $a^2$ will be drawn down, the core $a^3$ of the other electro-magnet, which is secured thereto, is simultaneously raised and the pin or projection $b^6$ thereon will break contact with its corresponding mercury cup $b^4$ and cut off the flow of current. The core of the magnet $a$ which is thus energized is drawn down so that the pin or projection $b^5$ thereon dips into the corresponding mercury cup $b^3$, and renders the circuit of the other electro-magnet in condition for current to flow when the thermostat pertaining to the system is operated to connect the battery or other source of current with the aforesaid circuit. The circuits for both of the electro-magnets are the same and are so arranged that the pin or projection on the core of the one electro-magnet breaks the circuit of the other electro-magnet when this latter is energized and its core or armature is attracted.

Any suitable type of valve may be employed in connection with the apparatus and it may have an angular or rectilinear movement to or from its seating.

The arrangement of the apparatus is such that it may be actuated with very little power and in this manner the current required is of a low order and will not harm the thermostat pertaining to the system.

The thermostat employed in the system is of the maximum and minimum thermometer type. Figs. 5 to 7, in which a fluid or gas of high coefficient of expansion is sealed in a bulb or cylinder $d^5$ open at one end to a U-tube $d^6$ containing mercury. Above the mercury $d^7$ in the two limbs of the U tube platinum contacts $d^8$, $d^9$ are sealed, a third common contact $d^{10}$ being provided at the bottom of the tube. The action is such that an expansion or contraction of the fluid or gas in the sensitive bulb $d^5$ due to an alteration of the external temperature moves the mercury from one contact to the other, alternately making and breaking a maximum and minimum contact. In order to obtain great sensitiveness without using an excessively long U tube the bore of the tube may be restricted at the contacts in such a manner that the movement of the mercury for changes in temperature is considerably increased. The contacts $d^8$, $d^9$ in the respective limbs thereof may be connected to the corresponding electro-magnets of the apparatus and the central or mid contact connected to the battery or other source of current. It is, however, advantageous to employ an intermediate switch $f$ between the thermometer and the apparatus and such switch may be arranged as a change over switch and having contacts and mercury pots at each end of its rocking member.

The intermediate switch is provided with electro-magnets $f'$, $f^2$ which are energized to operate the rocking member or armature $f^3$. This latter member comprises a tube or the like containing a mass of mercury or other conducting fluid $f^4$ which is adapted to make electrical connection between the outer contacts $f^5$, $f^6$ and the pivot $f^7$, the arrangement being such that the circuit of the electro-magnet which is established by the thermostat is broken immediately when the rocking member $f^3$ is moved to the desired position, at the same time the mercury in the rocking member renders the circuit of the other electro-magnet in condition for the next operation of the switch. When this intermediate switch $f$ is employed it may be compactly arranged with the thermometer or thermostat $g$ in a suitable casing $g'$ and this latter may be readily moved to any part of the installation as desired. The contacts $d^8$, $d^9$ in the limbs of the thermometer $g$ are connected to the windings of the respective electro-magnets $f'$, $f^2$ of the switch $f$ and the actuation of the rocking member $f^3$ of the switch causes the mercury or other electric conducting fluid $f^4$ to travel form one end to the other of the rocking member or tube and in so doing break the circuit of the electro-magnet that is causing the switch to rock. The rocking member of the switch is provided with a contact $g^2$ at each of its ends, said contacts being adapted to enter mercury cups $g^3$ arranged in proximity thereto. The contacts $g^2$ (Fig. 6) are electrically connected to the rocking member $f^3$ of the switch which is connected to the negative pole of the battery $f^4$ or other source of current, while the mercury cups $g^3$ are connected to the respective electromagnets or solenoids $a$, $a'$ of the main apparatus controlling the valve or other obturating member $c^5$ pertaining to the system. Current is only taken from one or two of the cells of the battery $f^4$ to actuate the intermediate switch $f$ and the current passing through the conducting fluid $d^7$ of the thermometer $g$ is thereby kept low. The current from the whole battery is however passed through the main apparatus as the energy required to operate the same will be much greater than that required to operate the intermediate switch.

When the temperature varies, the thermometer $g$ will connect one or other of the contacts $d^8$, $d^9$ in its limbs with the mid contact $d^{10}$ thereof, and current will flow from the battery $f^4$ to actuate the intermediate switch $f$. Assuming the left hand contact $g^3$ to make contact with the mercury in the corresponding cup $g^3$ the circuit of the electromagnet $a$ pertaining to the controlling means is closed at the said mercury cup into which the contact on the rocking member of the switch is immersed during the aforesaid movement. Current will then flow from the battery $f^4$ through the pipework $b^2$ of the installation, through the lead $d^3$ (Fig. 2) core $a^3$, pin $b^6$, mercury cup $b^4$, lead $d^4$ (Fig. 1), electromagnet $a$, lead $f^5$, left hand contact $g^2$ of the intermediate switch, rocking member $f^3$ and through the lead $f^6$ back to the battery. The apparatus will thus be operated to close the valve $c^5$, and the valve will remain in this position until the correct temperature is attained. When the circuits are arranged in the manner described, the circuit pertaining to the main apparatus will always be broken at one of the mercury pots $b^3$, $b^4$ thereof, so that no sparking will take place at the intermediate switch $f$, which being of lighter and more delicate construction would be harmfully affected by such sparking.

What we claim and desire to secure by Letters Patent of the United States is:—

1. In a system for automatically controlling or regulating the flow of gases or fluids, the combination of a source of electric current, a mechanical obturating device, plungers connected to said device, solenoids for actuating said plungers, means for connecting the said solenoids with the source of current, hollow members carried by said plungers and mercury pots serving in conjunction with said hollow members for controlling the circuits of the solenoids.

2. In a system for automatically controlling or regulating the flow of gases or fluids, the combination of a source of electric current, an obturating device, a spindle carrying said device, a sector on said spindle, a flexible member passing over and secured to said sector, plungers at each end of said flexible member, solenoids for actuating said plungers, means for connecting the said solenoids with the source of current, hollow members carried by said plungers and mercury pots serving in conjunction with said hollow members for controlling the circuits of the solenoids after the termination of the movement of the plungers.

3. In a system for automatically controlling or regulating the flow of gases or fluids, the combination of a source of electric current, an obturating device, a spindle carrying said device, a pulley on said spindle, a flexible member passing over and adjustably secured to said pulley, plungers at each end of said flexible member, solenoids for actuating said plungers, means for connecting the said solenoids with the source of current, hollow members carried by said plungers, and mercury pots serving in conjunction with said hollow members for controlling the circuits of the solenoids after the termination of the movement of the plungers.

4. In a system for automatically controlling or regulating the flow of gases or fluids, the combination of a source of electric current, an obturating device, plungers connecting with said device, solenoids for actuating said plungers, means for connecting the said solenoids with the source of current, a hollow container carried by each of said plungers, a restricted passage in each of said containers and mercury pots which serve in conjunction with said containers to control or time the circuits of the said solenoids.

5. In a system for automatically controlling or regulating the flow of gases or fluids the combination of a source of electric current, a valve, a spindle carrying said valve, a sector on said spindle, a flexible member connected to said sector, armatures arranged at each end of said flexible member, projections carried by said armatures, mercury cups into which said projections are adapted to enter, electromagnets for actuating said armatures, and means for connecting the electromagnets with the source of current.

6. In a system for automatically controlling or regulating the flow of gases or fluids, the combination of a source of electric current, a valve, a spindle carrying said valve, a sector on said spindle, a flexible member passing over and adjustably connected to said sector, armatures arranged at each end of said flexible member, projections carried by said armatures, mercury cups into which said projections are adapted to enter, electromagnets for actuating said armatures, and means for connecting the electromagnets with the source of current.

7. In a system for automatically controlling or regulating the flow of gases or fluids, the combination of source of electric current, a valve, electromagnets, armatures for said electromagnets, gearing for imparting the movements of the armatures to the valve, means for connecting the electromagnets with the source of current, hollow members carried by said armatures, and mercury pots which serve in conjunction with said hollow members for controlling the circuits of the electromagnets after the termination of the movement of the armatures.

In testimony whereof we affix our signatures in presence of two witnesses.

THOMAS JOSEPH RORKE.
EDWIN RORKE.

Witnesses:
 WALTER J. SKERTEN,
 T. SELBY WARDLE.